Feb. 8, 1966  N. O. PHILLIPS  3,233,684

CULTIVATING APPARATUS

Filed Dec. 13, 1961  4 Sheets-Sheet 1

NOAH OLIVER PHILLIPS
INVENTOR.

BY  Ely Silverman

ATTORNEY

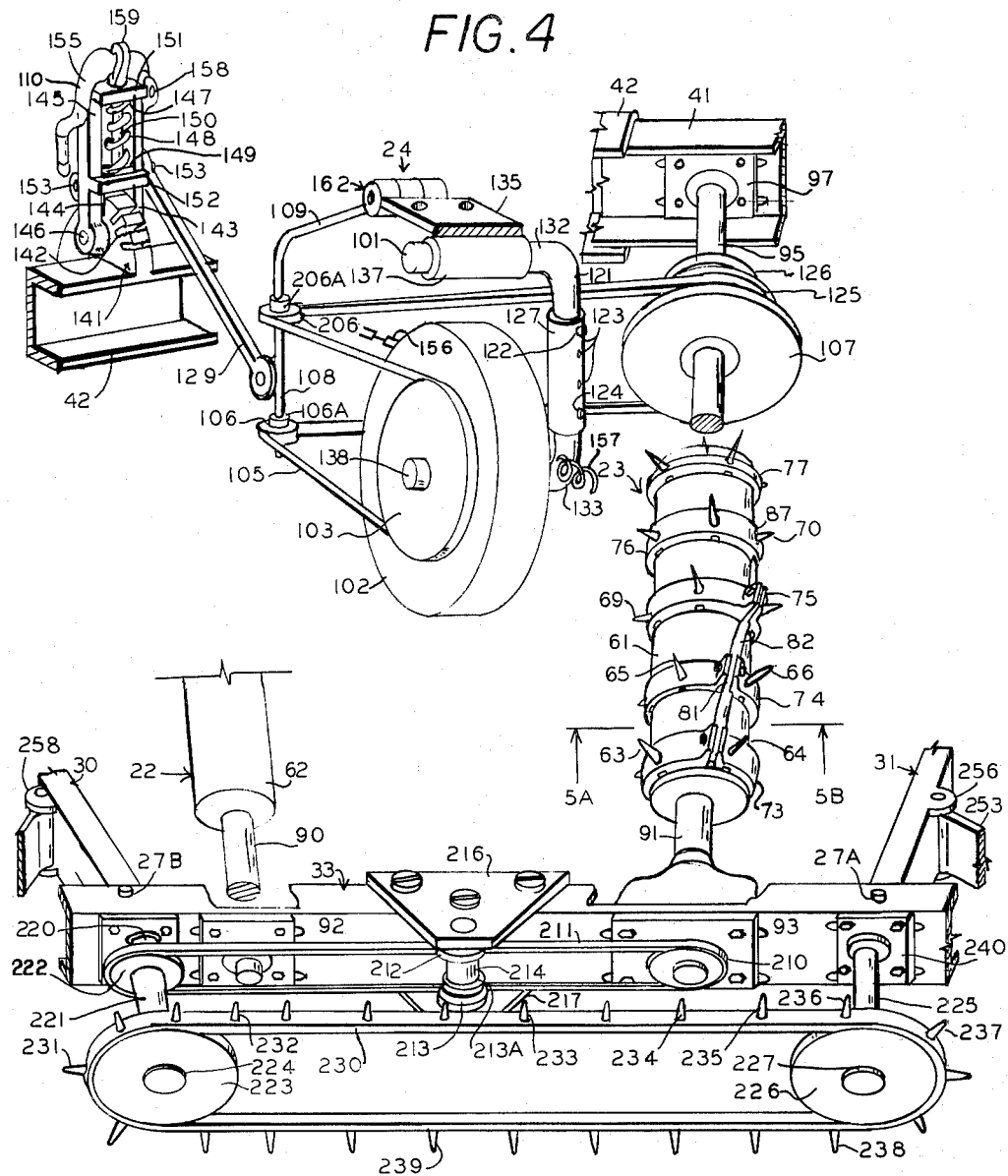
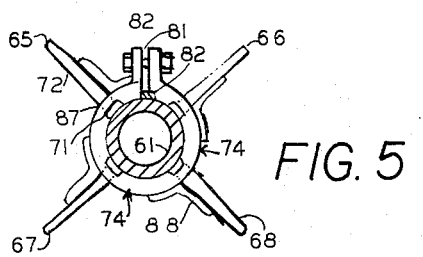
FIG. 4
FIG. 5

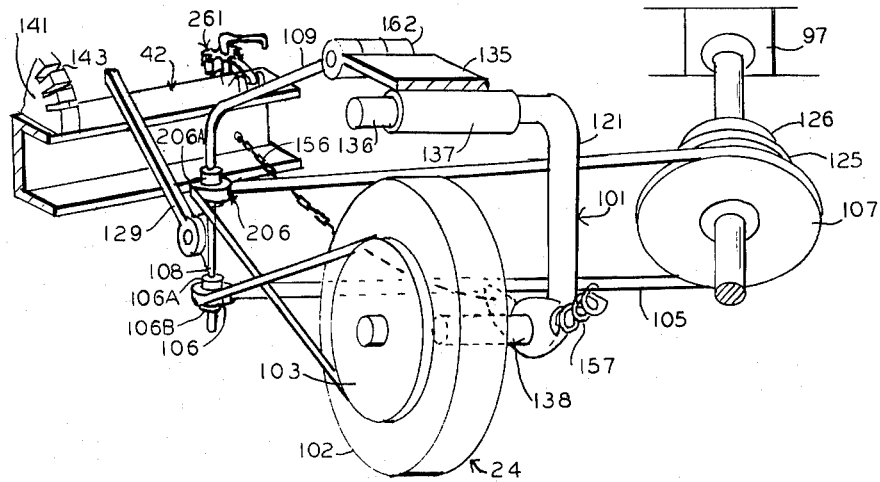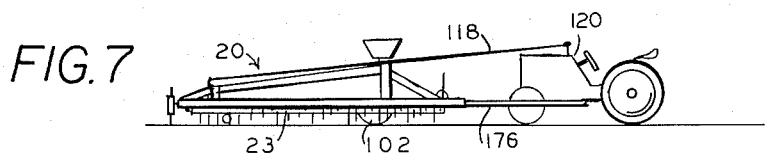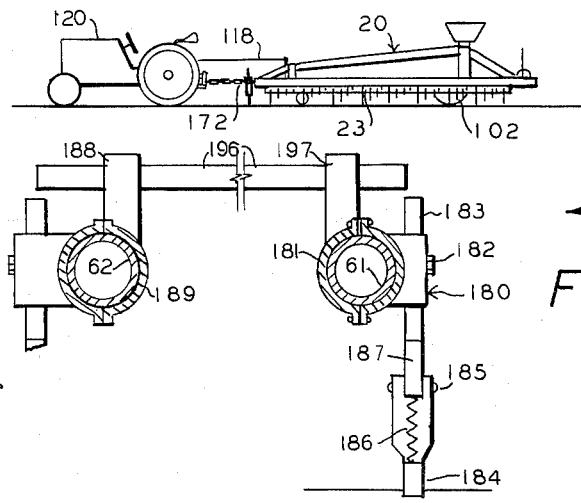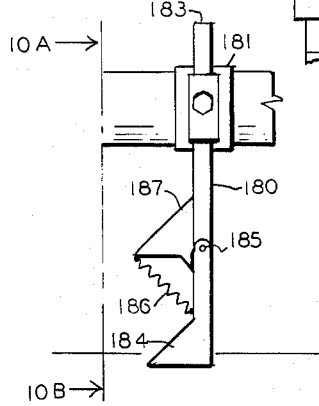

| United States Patent Office | 3,233,684
|---|---|
| | Patented Feb. 8, 1966 |

3,233,684
CULTIVATING APPARATUS
Noah Oliver Phillips, 219 N. Taylor St., Amarillo, Tex.
Filed Dec. 13, 1961, Ser. No. 158,957
6 Claims. (Cl. 172—106)

This invention generally relates to a cultivating apparatus. More particularly, this invention relates to a novel frame assembly for driving cultivating tools, the combination of said frame and cultivating tools driven and supported thereby, and the tools driven by said frame assembly.

One object of this invention is to make an improved cultivating tool driving and carrying apparatus deriving energy required for driving of the cultivating tools carried thereby from means drawing or pushing said apparatus by the contact of such apparatus with the ground.

Another object of this invention is to make a frame assembly broadly usable for ground cultivating and treatment.

Yet another object of this invention is to make a cultivating apparatus organized to permit each of several alternative tools to be used therein.

Yet another object of this invention is to provide an improved rake and harrow apparatus.

Still further objects advantages of the apparatus made according to this invention will be apparent to those skilled in the art in view of the descriptions thereof given in the below specification of which specification the drawings attached hereto form a part and wherein:

FIGURE 4 is a diagrammatic view of a driving wheel and its connections during use of the apparatus of FIGURE 1 as a rake;

FIGURE 5 is a sectional view taken through section 5A–5B of FIGURE 4;

FIGURE 6 is a diagrammatic view of a driving wheel and its connections during use of the apparatus of FIGURE 4 as a harrow;

FIGURE 7 shows the apparatus of FIGURE 1 used as a rake in combination with a tractor;

FIGURE 8 shows the apparatus of FIGURE 1 used as a harrow in combination with a tractor;

FIGURE 9 shows a stationary footpiece as used with apparatus of this invention as seen along direction of arrow 9A of FIG. 10; and FIGURE 10 is a view of the footpiece and its mounting as seen along section 10A–10B of FIGURE 9.

Figure 1:
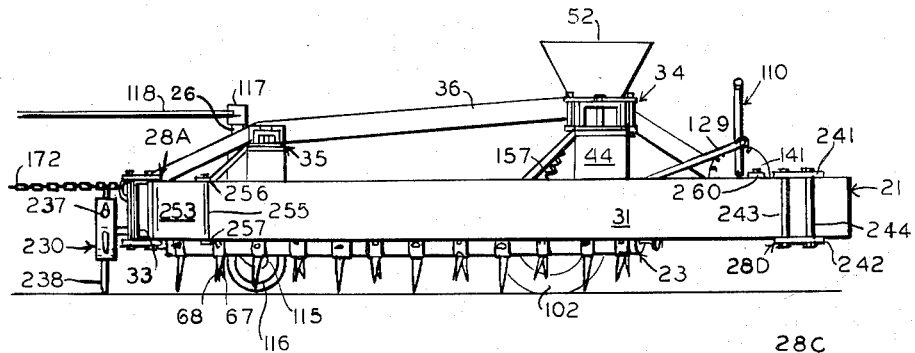
FIGURE 1 is a side view of a preferred embodiment of the assembled apparatus according to this invention.

A preferred embodiment of the apparatus 20 made according to this invention comprises an adjustable frame sub-assembly 21; a pair of longitudinally elongated drum sub-assemblies 22 and 23; a pair of main support and drive wheel sub-assemblies 24 and 25; and a steering wheel sub-assembly 26.

The frame comprises side members 30 and 31, adjustable rear end member 32, front end member 33, adjustable rear cross-piece 34, adjustable front cross-piece 35, and a central longitudinal member 36.

The side members 30 and 31 are quite rigid. These are, in the preferred embodiment, made from 5" steel channel to be longitudinally rigid and sturdy. These members are adjustably yet firmly joined together with bolts, as 27A, 27B, 27C, and 27D, and adjustable trussing clamp sub-assemblies as 28A, 28B, 28C, and 28D. Side pieces 30 and 31 and truss members as 39''', and 39'', 39, and 39' respectively fixedly support strong vertical steel channel members 37, 38, 43, and 44. The tops of each such vertical members fixedly support lower pivot plates as 57B on member 43 and 47B on member 44, respectively. In the preferred embodiment, each lower pivot plate is 6" diameter, ¼" thick steel. Cylindrical ¾" diameter steel pivot lugs 58, 48, 59, and 49 are each respectively firmly attached to and project from the center of each such lower pivot plate.

Lateral steel channel members 40 and 41 slidably yet firmly fit and are held in place in central channel 42. Thereby, the width of the frame 21 and the width of the swathe covered by the drums carried by the frame is adjustable; in the preferred embodiment the rear frame width may vary from 8 to 16 feet.

The members generally shown as 34 and 35 comprise, respectively, central channel members 45 and 55 and respective lateral channel members 46, 47, and 56, 57 adjustably fixed thereto and extensible therefrom. The lower lateral end of each lateral member is, respectively, attached to a upper circular pivot plate 46A, 47A, 56A, or 57A (¼" thick 6" diameter in the preferred embodiment). Each upper pivot plate and corresponding lateral member has a ¾" I.D. circular hole through which lugs 48, 49, 58, or 59 respectively project to a terminal lock nut, as 48A, 49A, 58A, or 59A. The lower plates support the respective upper pivot plates and the pivot lugs and nuts pivotally, yet firmly, connect the cross pieces 34 and 35 to the vertical channel members.

The drums 22 and 23 each comprise an 8" I.D. steel pipe 61, in the preferred embodiment, 14 feet long. A plurality of ground-engaging teeth, as 63–70, each extend radially from each said drum. The teeth are L-shaped, having a base 71 and an arm 72. Each base 71 is held in place by C-shaped perforated steel strap, as 73–80, firmly fitting onto each pipe, as 61, and spaced 6" apart from each other along the length of each pipe. A helical steel bar 82 is wrapped firmly around each pipe, as 61, and fits into an opening 81 therefor in each strap; it serves to distribute the torque met by any one tooth over the length of the entire pipe. Perforations 87 in each strap fix the location of each tooth in a strap to the other teeth thereby held. Angles, as 88, may help support the teeth in position.

Pipes 62 and 61 are each rotatably supported through front shafts 90 and 91 in front conventional bearings or mountings 92 and 93 respectively on the front end member 33 and via rear shafts 94 and 95 respectively on rear conventional bearings on mountings 96 or 97 respectively on the rear end member 32. The position of each of these conventional mountings is adjustable along the length of said front or rear frame members.

The front teeth on each one drum as 22, are 8" long total and spaced to describe on rotation of said drum 22 about its supporting shafts 90 and 94, a circle that almost, but not quite, contacts the circle described by the front teeth on the other drum, as 23 on rotation of said drum 23 about its supporting shafts 91 and 95. This spacing apart avoids interference of the teeth with each other on rotation of the drum sub-assembly apparatuses to the left or right.

Each drive wheel sub-assembly, as 24, in the preferred embodiment, comprises an adjustable mounting clamp, one generally shown as 100, adjustably but firmly positioned on a lateral crosspiece member, as 47; a sturdy U-shaped support arm 101 rotatably supported by said clamp; and a wheel 102 supported on said arm. The wheel 102 supports a drive pulley 103 which pulley drives V-belt 105 past adjustable idler pulley wheels 206 and 106 to engage a drive pulley wheel as 107 on shaft 95 to which shaft is fixed corresponding drum 23. The pulley wheel shaft 108 is adjustably positioned by arm 129 which, through release and tightening mechanism 110, acts as a clutch to release or tighten belt 105. Sub-assembly 25 is a mirror image of sub-assembly 24.

Each drive wheel pulley, as 103, has a 15" diameter in the preferred embodiment and connects to a 5" diameter pulley 107 to provide a 3× (three times) speed increase when apparatus 20 is used as a harrow. However, for when the tool speed desired may be different, a plurality of different size diameter pulleys as 125, 126, and 107—all fitting the same belt 105—are accordingly fixed on shaft 95 so that a variety of speed ratios may be used; i.e., relatively low speed ratio for harrow, higher (6×) six times for a rake, and still higher (12×) twelve times as a shredder by using, respectively, pulley 107, 125, or 126.

The release mechanism 110 also provides for convenient changing from one speed ratio to the other, as below described.

The central arm portion 121 of the support arm 101 may be adjustable as to length, as in FIGURE 4, rather than being a solid bar, as in FIGURE 6, to adjust to desired height of drum teeth over the ground. Pins, as 122 and 124 in slots as 123 then serve to determine the overall length of arm portions 132 and 133 which are firmly held in a sleeve 127 and, also, splined into each other. Shims, as 134, may also be used over the bottom plates, as 135, of the mountings, as 100, for minor corrections of wheel height. The bottom and top plates of mountings, as 100 and 104, are bolted together for adjustable positioning thereof.

The horizontal upper arm portion 136 of the U shaped arm 101 fits rotatably, yet firmly, into a sleeve 137 which is firmly affixed, as by welding, on the bottom plate 135 of each mounting, as 100. Thereby the weight of the apparatus 20 exerts an upward force on the drive wheels, as 102, and a torque about each of the supporting arms therefor, as 101, which torque is resisted by the belt, as 105, bearing and tightening on the pulleys for the cultivating tool—as drums 22 and/or 23—to be driven thereby. The weight box 52 fixed to piece 34 contains water and/or sand or rocks to further improve utilization of the energy of the pulling or pushing machine, as 120, to drive the tools, as 22 and 23, carried by the apparatus 20.

The front wheel sub-assembly comprises a vertical sleeve 111 firmly fixed to the central crosspiece member 55, an axle 112 smoothly, yet rotatably, fitting into said sleeve and a shoulder 114 adjustable as to height which locates and supports the axle in the sleeve: a backwardly sloped yoke 115 rotatably supports the ground contacting steering wheel 116 on axle 112. Conventional means, as a toggle, 117, and cables, as 118 and 119, are provided for control of the steering when the apparatus, 20, is pushed as in FIGURE 7; the backward slope of yoke 115 permits the apparatus to follow the tractor 120 when used in a combination as in FIGURE 8. Toggle and yoke are fixed to axle 112.

The rear crosspiece member 34 is near to, but slightly to the rear of, the center of gravity of the entire apparatus 20 in order to provide the maximum drive power to each drive pulley, as 107, available from the machine weight, yet avoid that the front steering wheel sub-assembly 26 rise from the ground at each bump.

FIGURES 1-5 show the apparatus arranged to operate as a rake: FIGURE 6 shows the changes in the belt position to make the apparatus operate as a harrow. For purpose of operating as a harrow, the front wheel is adjusted to allow the front drum teeth, as 63-70, to bite 1"-1½" in the soil and the rear wheels are adjusted, by moving the support for the idler pulleys and/or adjusting length of arm 121 to permit the rear teeth on the drum to bite 1"-1½" in the ground. The spacing of the rear of the drums is adjustable in order, when the device is used as a rake, to provide windrows of desirable width and size.

The size needed depends on the moisture content of the hay in such windrows and the time needed to create such windrows. The greater the moisture content, the smaller the windrow size desired; for economical operation however, the widest windrows are desired. The apparatus of this invention allows ready choice of the optimum relative spacing of the rear of the drums.

The manner in which this device is constructed allows its use not only as a rake and harrow but also permits the width of the machine to be quickly adjusted (and the mounting frame for each of the wheels is readily adjustable laterally along the yokes or crosspiece 34).

The rotating teeth are self-clearing and so provide a rake action or a harrowing action that does not get blocked by weeds as conventional stationary weeding elements do. Thereby this device provides a readily adjustable machine of readily adjustable width with a tool drive derived from the weight of the machine and the moving force therefor; this obviates the need and expense of a direct mechanical drive. The sub-assemblies of this device, as mounting 100, have been shown as movable manually. However, these may also be actuated and positioned by screw threads as 128 in order to more readily and quickly locate them. The idler pulley wheels 206 and 106 act primarily as a mechanism to change the direction of the thrust on the pulley 103 from the retractable wheel 102 to drive a tool, as 23, via pulley 107. These idler pulley wheels are also used as a clutch in an appropriate mechanism, 110, below described, provided to release and/or control the tension in the belt 105.

The belt tension control and release mechanism broadly indicated as 110 for idler wheel shaft 108 comprises a circular ratchet plate 141 firmly fixed to channel 42 in a plane normal to the length of said channel and provided with slots as 142, 143, 144. Elongated vertical locking arm 145 is rotatably fixed at pivot 146 to the plate 141. An internal shoulder 147 on upper guide 151 of arm 145 compresses a spring 148; this spring presses down on shoulder 149 of the locking shaft 150 and presses such shaft into a ratchet slot as 144: Guides 151 and 152 on arm 145 encircle shaft 150 and then hold arm 145 in fixed position relative to slot 144. Pin 153 on arm 145 pivotally holds one end of arm 129; the other end of arm 129 is pivotally attached to shaft 108. Shaft 108 is hingedly attached at its upper end 109 to pivot hinge 162 on bottom plate 135 of wheel mounting 100 and is, thereby, firmly hingedly attached to crosspiece 34. J-shaped release arm 155 is hingedly attached to arm 145 at pivot hinge 158: raising arm 155 urges the ring 159 at top of, and integral with, shaft 150 upward and releases the bottom of said shaft from the slot 144 and permits arm 145 and pin 153 and arm (see FIG. 6) to be pivotally moved about pivot 146 and shaft 150 to be located in any ratchet slot, as 142, 143, or 144, as desired. Thereby the position of shaft 108 and tension on the belt 105 may be adjusted. Chain 156 is attached to channel 42 and arm 138 and supports the arm 138 when belt 105 tension is released by the above discussed action of the quick release mechanism 110 and so supports apparatus 20 over the ground during change of connection of drive belt 105 from one pulley, as 125, to another, as 126 or 107. A spring 157 is attached to the lower portion 138 of arm 101 and to member 45 thereby maintaining the tension in belt 105 during normal vibrations met by the operation of the apparatus 20. Similar structures are provided for the wheel sub-assembly 25 as above discussed for wheel sub-assembly 24. The apparatus 20 is provided with hooks 170 and 171 on front channel member 33 for drawing the apparatus 20 behind a tractor as 120 in FIGURE 8 by means of chains as 172 and 173. Apertured lugs 174 and 175 are firmly attached to rear channel member 42 for attachment of pushing bars as 176 between the tractor as 120 and the apparatus 20 when said apparatus 20 is to be pushed, as shown in FIGURE 7.

It is also within the scope of this invention that cultivating tools, such as stationary footpiece 180 in FIGURE 9, fixed in position relative to the frame 21, be used therewith. For such tool a clamp as 181 is attached to each pipe, as 61, 62, and the footpiece held thereto by an adjustable tightening means as 182. The footpiece comprises a vertical support member, as 183, an adjustably deflectable cultivating tool 184 hingedly attached thereto as about pivot 185, and adjustable resilient spring means, as 186, attached to said tool and to a shoulder 187 on said support member 183 and releasably holding the tool in operative position; also, a cultivating device as in U.S. Patent No. 2,312,405 may be used as footpiece 180.

A series of such footpieces may be attached to each pipe as 61 and 62 in positions as shown for clamps 73–80 with clamps as 181 replacing such clamps as 73–80; when such footpieces are to be used each pipe as 61 and 62 is fixed in position on the frame by a plurality of horizontal bridging members, as 196, each firmly attached to each otherwise rotatable pipe as by clamp elements 197 and 188 on clamps 181 and 189, respectively, on pipes 61 and 62, respectively. The V-belt 105 may be disconnected when such stationary tools are used or the V-belt may then be connected to and drive some other apparatus supported on the frame 21. The wheels as 102 (25" diameter in the preferred embodiment) of each sub-assembly 24 and 25 may be provided with tread that is cleated or ribbed as desired to obtain the necessary grip on the ground dependent upon the terrain and the nature of the operation to be performed in order to obtain adequate force to drive the cultivating tool as 22 and 23 at the speed and depth desired.

According to my invention teeth of various shapes and sizes may be held in the clamps 63–70 other than those above specifically discussed and the direction and speed of rotation of the tools on the drums, as 22 and 23, is readily controlled and adjusted. Further, the depth of the action of the teeth is also readily regulated; this is in addition to the adjustability of frame and drum swathe width above discussed.

The energy transmitted by the belts as 105 may be used to drive a sprayer or to grind and mix fertilizer as well as perform the above discussed raking, harrowing or shredding actions. The device is conveniently made and the parts readily held in the proper place by conventional locking screws or bolts as 200, 201, 202, 203, etc. held in place on the main channels, as 42, 45, 55, and preferably, with corresponding slots as 40' and 40", 41' and 41", 46' and 46", 47' and 47", 56' and 56", 57' and 57" or sets of holes in the member to be fixed in place thereby relative thereto, such as channels 40, 41, on 42; 46, 47, on 45; and 56, 57, on 55; respectively. All parts are, it will be further noticed, readily manufactured and replaceable yet firmly and securely held in place in a stable operating position.

Figure 2:
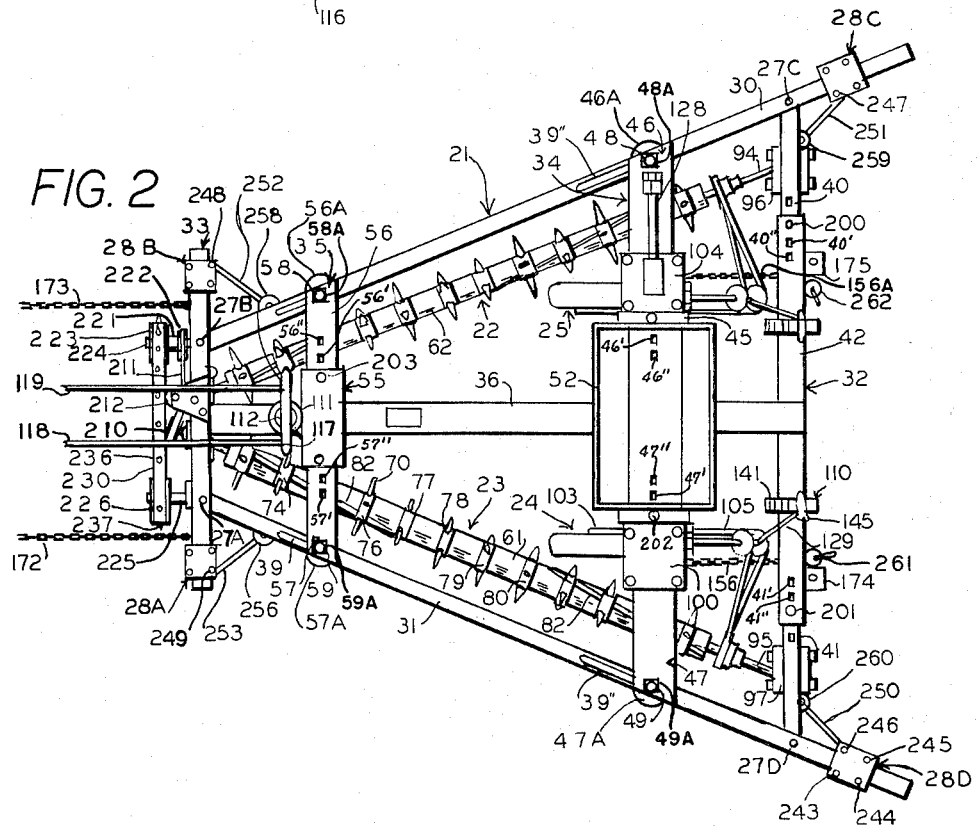
FIGURE 2 is a top view of the assembled apparatus of FIGURE 1.
Figure 3:
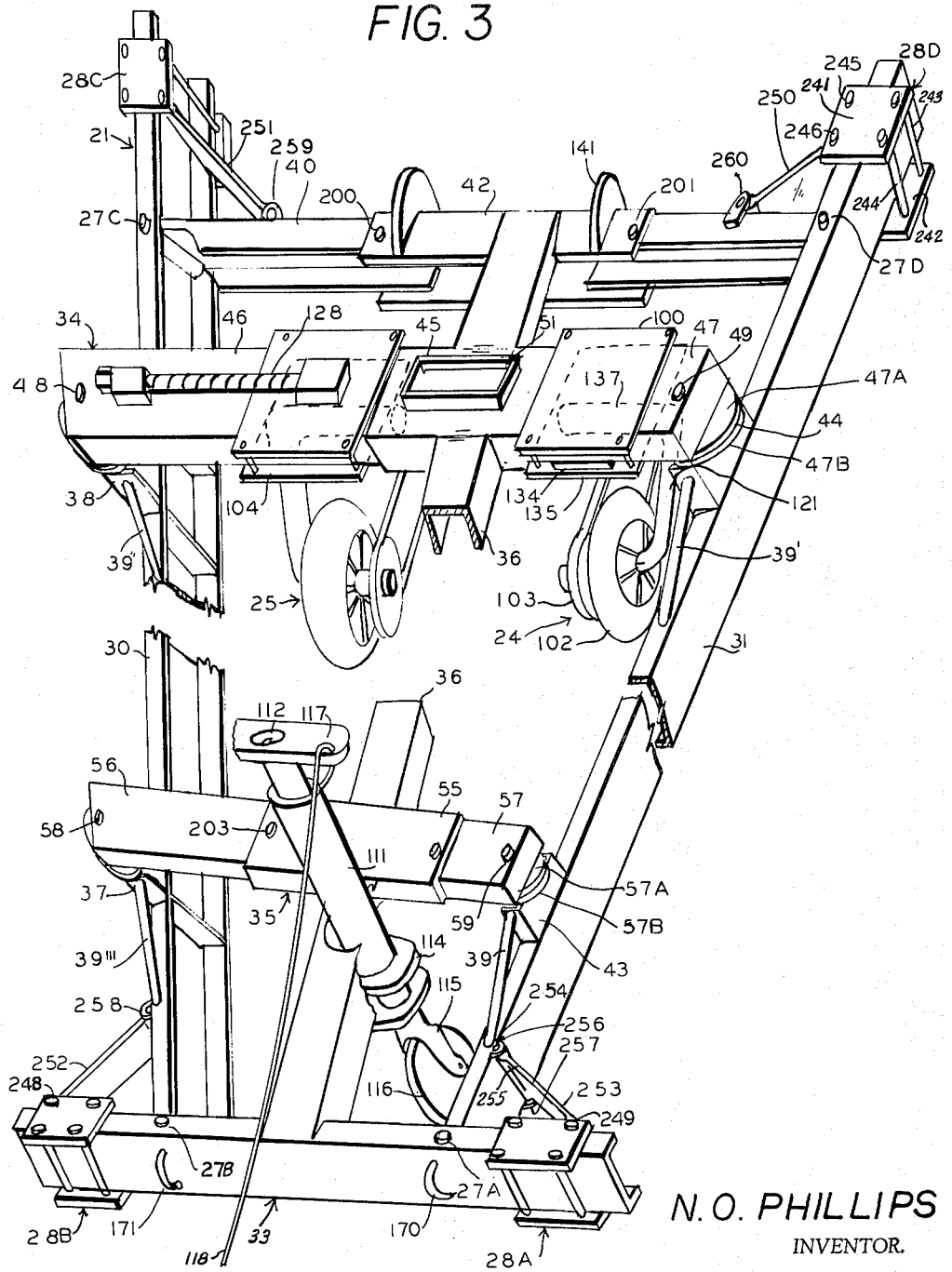
FIGURE 3 is a perspective view, partly broken away, of the frame of apparatus of FIGURE 1 shown without the drum sub-assemblies thereof and shown diagrammatically.

According to the preferred embodiment of this invention, shaft 91, driven as above described by assembly 24, projects through the mounting 93 on member 33 to drive a pulley wheel 210. Wheel 210 drives a belt 211 past rotatable idler wheels 212 and 213 which are concentrically mounted on idler wheel shaft 214. Idler wheel shaft 214 is firmly mounted between adjustable top mounting bracket 216 and bottom mounting bracket 217. These brackets are adjustably, yet firmly, attached to member 33 near its center as shown in FIGURES 2 and 4.

Support brackets (as bracket 213A for pulley 213) rotatably locate the rotatable idler pulleys 212 and 213 respectively on their shaft 214; pulley wheels such as 106 and 206 are similarly concentrically mounted and positioned on their shaft, as 108, by brackets 106A, 106B, and 206A, 206B respectively.

A forwardly projecting horizontal cylindrical steel shaft 220 is firmly mounted on member 33 near the lateral position thereon of bolt 27B and supports cylindrical sleeve 221 rotatably thereon. Pulley wheels 222 and 223 are firmly, yet removably, and concentrically mounted on that sleeve, as by splines and screws. Sleeve 221 is freely rotatably mounted on shaft 220 as with bearings at both ends and held in place by terminal nuts, as 224, at each end of the sleeve.

A forwardly projecting horizontal steel cylindrical steel shaft 225 is firmly mounted on member 33 near the lateral position thereon of bolt 27A. It rotatably supports a pulley wheel, 226, on a concentrically located rotatable bearing 227, which bearing is fixed in place on shaft as 225 by nuts.

A belt 230 with a plurality of regularly spaced teeth thereon, as 231–239 is supported on and driven by the pulleys 223 and 226. The bottom of the points of teeth as 231–239 travel in the same horizontal plane as the bottom points of the teeth as 63 on the drums 21 and 22.

The teeth as 231–239, for the belt shown generally as 230 serve to rake material laterally otherwise lying between the front teeth of drums 22 and 23. These teeth are, in the preferred embodiment, of the same length and size as, and interchangeable with, the teeth 63–70. The teeth 231–239 may be removed from belt 230 in the preferred embodiment. The shaft 225 has an adjustable yet firm mounting 240 attaching it to member 33 in order to adjust said belt for slack and wear and facilitate its replacement.

Each trussing sub-assembly, as 28A, 28B, 28C, and 28D comprises a trussing clamp sub-assembly, a link member and a link fastening sub-assembly. As shown for sub-assembly 28D, each trussing clamp sub-assembly comprises an upper plate, as 241, and a lower plate 242 adjustably joined by a plurality of vertical fastening bolts as 243, 244, 245, 246. These permit tightening of such sub-assemblies on and movement of such clamp sub-assemblies 28A, 28B, 28C, and 28D along members 33, 33, 31, and 31 respectively in an adjustable manner, which is the same manner as that by which mountings 100 and 104 are adjustably positioned along member 45.

Each truss link sub-assembly, as 250, 251, 252, 253, comprises a ¼" thick, 3" wide, 12 to 24" long (in the preferred embodiment), strong steel plate with a sleeve at both its ends. The axis of each sleeve on each link is in the plane of the widest face of the link as shown in FIGURE 4. One vertical bolt, as 246 in member 28D, and corresponding members, as 247 on sub-assembly 28C, 248 on sub-assembly 28B and 249 on sub-assembly 28A, respectively, firmly yet rotatably fit in a sleeve at one end of said rigid truss link member. The other end of each link is attached to a link fastening sub-assembly which includes a bolt and ears. The bolt, as 254, is attached to a sleeve, as 255, at the other end of truss link member, as 253, distant from the corresponding trussing clamp sub-assembly. The bolt is attached to projecting ears as 256 and 257 which are each rigidly fastened on the member as 31 adjacent to and pivoted to that on which the corresponding truss clamp sub-assembly, as 28A is fixed. Corresponding ears, as 258, 259, 260 are provided for each of the trussing clamp sub-assemblies 28B, 28C, and 28D. Thereby the frame 21 is made rigid at any desired angle between members 30 and 31 and the members adjacent thereto.

Chain 156 may be adjusted by a screw jack 261, and chain 156A similarly adjusted by a screw jack 262 attached to member 42 in order to readily and controllably move the sub-assemblies 24 and 25 as desired. The jack may be replaced by hydraulic controls within the scope of this invention.

Although, in accordance with the provision of the patent statutes, particular embodiments of this invention have been described in detail and the principle of the invention has been described in the best mode in which it is now contemplated applying such principles, it will be understood that the constructions shown and described are merely illustrative and that the invention is not limited thereto and, accordingly, alterations and modifications which readily suggest themselves to persons skilled in the art without departing from the true spirit of the disclosure hereinabove are intended to be included in the scope of the annexed claims.

I claim:

1. In a cultivating appartus, a frame comprising front and rear members and left and right side members, said rear member being adjustable as to length, cross-pieces adjustable as to length located between said front and rear members and extending from one side member to the other, a plurality of wheel mountings on said frame, a plurality of ground engaging wheels rotatably mounted on said wheel mountings, and each of said wheel mountings comprises an upper horizontally extending member and a lower horizontally extending member extending parallel to said upper member, said upper and lower horizontally extending members each being spaced apart from each other and firmly fixed with respect to each other through an intermediate strong rigid vertically extending member firmly attached near its ends to each of said upper and lower members, said intermediate strong rigid member being firmly connected at its upper end to said upper member and at its lower end to said lower horizontally extending member, a housing supported on one of said cross pieces, said upper horizontally extending member being supported in said housing, each wheel located near the center of gravity of said apparatus and to the rear thereof, energy transmission means attached to and driven by one of said wheels, tool mountings on the front and rear members of said frame and laterially adjustable theron, a tool between said members and supported on said tool mountings, said energy transmission means connecting said tool and said wheel whereby the movement of the wheel drives the tool.

2. Apparatus as in claim 1 comprising a weight box fixedly located on said frame above said wheels.

3. Apparatus as in claim 6 wherein said tool is a toothed drum assembly extending from the front to the rear of the frame and rotatably supported thereon, said toothed drum assembly comprising a longitudinally extending cylinder with a shaft at each end therof, a pulley on the shaft, a series of clamps longitudinally spaced along the length of each drum, said clamp being perforated and ground contacting tools being held to said drum by the body of each said clamp, a portion of said tools projecting through the perforations in said clamps.

4. Apparatus as in claim 3 wherein a helical member extends along the length of the drum and around the surface thereof and is positioned between each of said C-clamps and said drum thereby fixing the relation of one such C-clamp to another on said drum.

5. Apparatus as in claim 3 wherein said energy transmission means is a pulley belt, a plurality of pulleys of varying diameters are located on each said shaft of said drum assembly, and a plurality of pulleys are provided along the line of said belt for adjusting the tension on said belt between said ground engaging wheels and said pulleys on said shaft.

6. A cultivating apparatus comprising a longitudinally extending drum and a shaft at each end thereof, a pulley on a shaft and firmly affixed thereto, means on said apparatus to drive said pulley, a series of longitudinally spaced C-clamps longitudinaly spaced along the length of said drum, said C-clamps each being perforated, and L-shaped, ground-engaging teeth, each being held to said drum by the body of one of said C-clamps and a portion of each of said L-shaped teeth projecting through a perforation in said C-clamp, and a pair of radially extending flanges on each C-clamp, one flange at each end of said C-clamp, said pairs of flanges being circumferentially spaced from each other, and comprising a helical member which extends along the length of the drum and around the surface thereof and is positioned between the ends of said radially extending flanges of each of said C-clamps and said drum whereby each of said C-clamps fixes the relation of one such C-clamp to another on said drum.

References Cited by the Examiner

UNITED STATES PATENTS

| 30,771 | 11/1860 | Stevens | 172—57 |
|---|---|---|---|
| 72,438 | 12/1867 | Worley | 172—554 |
| 967,189 | 8/1910 | Hanson | 172—106 |
| 1,005,792 | 10/1911 | Ashlimann | 172—108 |
| 1,016,381 | 2/1912 | Watson | 280—34 |
| 1,065,536 | 6/1913 | Lindquist | 172—48 X |
| 1,088,546 | 2/1914 | Cunningham | 172—108 X |
| 1,112,029 | 9/1914 | Perkins | 172—105 X |
| 1,288,608 | 12/1918 | Johnson | 172—544 X |
| 1,633,469 | 6/1927 | Atchley | 172—106 |
| 1,731,304 | 10/1929 | Gordon et al. | 172—106 |
| 2,325,278 | 7/1943 | Silver | 172—106 |
| 2,439,577 | 4/1948 | Blackledge | 172—106 |
| 2,485,057 | 10/1949 | McCormick | 172—554 |
| 2,664,040 | 12/1953 | Beard | 172—548 |
| 2,714,347 | 8/1955 | Roessler | 172—277 |
| 2,778,291 | 1/1957 | Kerns | 172 554 |

FOREIGN PATENTS

| 6,555 | 5/1904 | Denmark. |
|---|---|---|
| 718,764 | 11/1931 | France. |
| 1,047,829 | 7/1953 | France. |

ABRAHAM G. STONE, Primary Examiner.

A. JOSEPH GOLDBERG, Examiner.